United States Patent
Oerlemans

(10) Patent No.: US 9,841,002 B2
(45) Date of Patent: Dec. 12, 2017

(54) WIND TURBINE ROTOR BLADE WITH SERRATED EXTENSION

(71) Applicant: Siemens Aktiengesellschaft, Munich (DE)

(72) Inventor: Stefan Oerlemans, Herning (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 506 days.

(21) Appl. No.: 14/455,969

(22) Filed: Aug. 11, 2014

(65) Prior Publication Data
US 2015/0078896 A1 Mar. 19, 2015

(30) Foreign Application Priority Data
Sep. 18, 2013 (EP) .................................... 13184994

(51) Int. Cl.
F03D 1/06 (2006.01)
F03D 7/02 (2006.01)

(52) U.S. Cl.
CPC ......... *F03D 1/0641* (2013.01); *F03D 1/0608* (2013.01); *F03D 7/0296* (2013.01);
(Continued)

(58) Field of Classification Search
CPC .... F03D 1/0641; F03D 1/0675; F03D 1/0633; F03D 7/0296
See application file for complete search history.

(56) References Cited

U.S. PATENT DOCUMENTS

| 5,533,865 A | * | 7/1996 | Dassen | ................. F03D 1/0608 244/200 |
| 7,976,283 B2 | * | 7/2011 | Huck | .................... F03D 1/0633 415/119 |

(Continued)

FOREIGN PATENT DOCUMENTS

| CA | 2719171 A1 | 2/2010 | |
| DK | WO 2016001420 A1 * | 1/2016 | ........... F03D 1/0641 |

(Continued)

OTHER PUBLICATIONS

Stefan Oerlemans, "Detection of aeroacoustic sound sources on aircraft and wind turbines", http://doc.utwente.nl/67363/1/thesis S Oerlemans.pdf, chapter 8, ISBN 978-90-80-6343-9-8; 2009.
(Continued)

*Primary Examiner* — Kenneth Bomberg
*Assistant Examiner* — John S Hunter
(74) *Attorney, Agent, or Firm* — Beusse Wolter Sanks & Maire

(57) ABSTRACT

A wind turbine rotor blade is provided, having a root end, a tip end, a leading edge section, a trailing edge section and a serrated extension, wherein the serrated extension is attached to the trailing edge section and has at least a first tooth. Furthermore, the wind turbine rotor blade has at least one patterning element for guiding a wind flow which is flowing from the leading edge section to the trailing edge section such that noise which is generated at the trailing edge section is reduced. The patterning element has the shape of a ridge. Advantageously, the ridge-shaped patterning element is located upstream, compared to the first tooth, and/or is located on a surface of the first tooth. Furthermore, a method is provided to reduce noise which is generated at a trailing edge section of a wind turbine rotor blade.

14 Claims, 6 Drawing Sheets

(52) U.S. Cl.
CPC ..... *F05B 2240/122* (2013.01); *F05B 2240/30* (2013.01); *F05B 2260/96* (2013.01); *F05D 2260/961* (2013.01); *Y02E 10/721* (2013.01)

(56) References Cited

U.S. PATENT DOCUMENTS

| | | | |
|---|---|---|---|
| 8,267,657 | B2 | 9/2012 | Davidson |
| 9,140,233 | B2* | 9/2015 | Watts .................... F03D 1/0633 |
| 9,303,621 | B2* | 4/2016 | Fuglsang .............. F03D 1/0641 |
| 2011/0142665 | A1 | 6/2011 | Huck |
| 2011/0211966 | A1* | 9/2011 | Watts .................... F03D 1/0633 |
| | | | 416/223 R |
| 2011/0268558 | A1 | 11/2011 | Lin |
| 2012/0134837 | A1 | 5/2012 | Frere |
| 2012/0201689 | A1* | 8/2012 | Fuglsang .............. F03D 1/0641 |
| | | | 416/235 |
| 2015/0247487 | A1* | 9/2015 | Oerlemans ............ F03D 1/0675 |
| | | | 416/146 R |

FOREIGN PATENT DOCUMENTS

| | | |
|---|---|---|
| EP | 0652367 A1 | 5/1995 |
| EP | 1338793 A2 | 8/2003 |
| EP | 2309119 A1 | 4/2011 |
| WO | 2007140771 A1 | 12/2007 |
| WO | 2013020959 A1 | 2/2013 |

OTHER PUBLICATIONS

J.G. Schepers et al: "SIROCCO: Silent rotors by acoustic optimisation", ftp://ftp.ecn.nl/pub/www/library/report/2007/m07064.pdf; 2007.

* cited by examiner

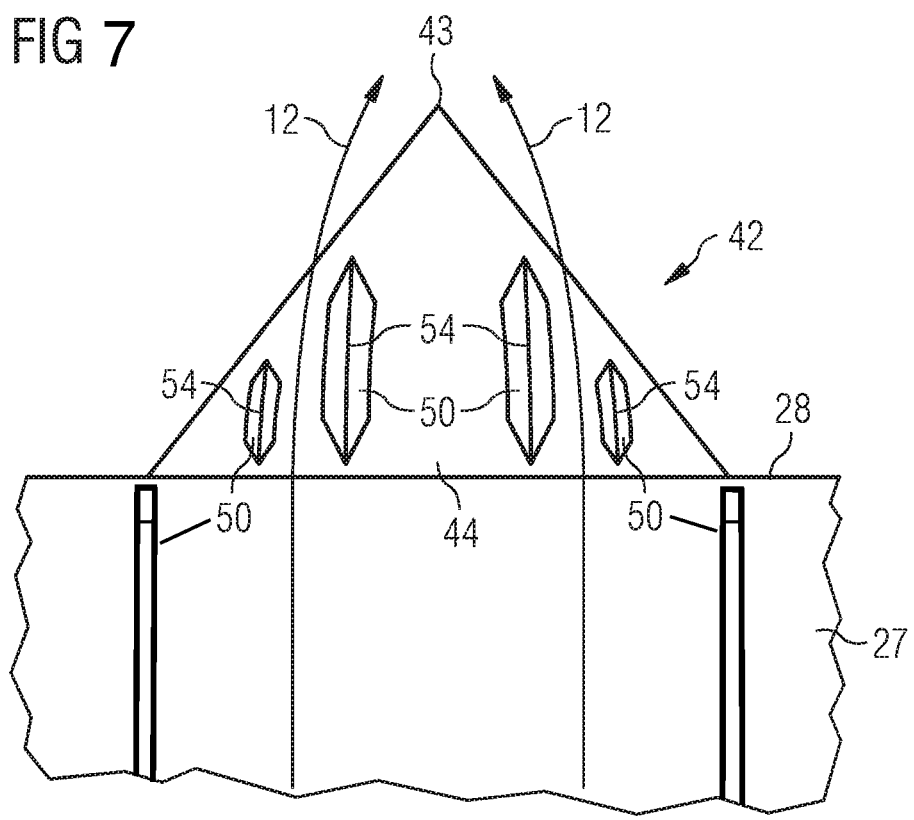

WIND TURBINE ROTOR BLADE WITH SERRATED EXTENSION

CROSS REFERENCE TO RELATED APPLICATIONS

This application claims priority to and the benefit of European Application No. EP13184994 filed Sep. 18, 2013, incorporated by reference herein in its entirety.

FIELD OF THE INVENTION

The present invention relates to a wind turbine rotor blade with a serrated extension, wherein the serrated extension is attached to a trailing edge section of the wind turbine rotor blade and comprises at least a first tooth. Furthermore, the invention relates to a method to reduce noise, generated at the trailing edge section of a wind turbine rotor blade.

BACKGROUND OF THE INVENTION

Noise which is emitted by a wind turbine may be a critical parameter, in particular if the wind turbine is erected onshore and in the proximity of a residential area. A significant share of the noise which is emitted by the wind turbine comes from the wind turbine rotor blades. More specifically, a significant share of the noise comes from the trailing edge section of the wind turbine rotor blades.

Thus, considerable effort has been undertaken for reducing the noise which is generated at the trailing edge section of the wind turbine rotor blade. One way to achieve a noise reduction are serrated panels which are attached to the trailing edge section of the wind turbine rotor blade. This idea or concept has been disclosed e. g. in the European patent application EP 2 309 119 A1.

However, further noise reduction would be beneficial. Thus, there exists the desire to provide means to reduce noise which is generated by a wind flow that is flowing across the wind turbine rotor blade of a wind turbine. More specifically, the means should be compatible with existing noise reduction means such as serrated panels.

SUMMARY OF THE INVENTION

This objective is achieved by the independent claims. The dependent claims describe advantageous developments and modifications of the invention.

In accordance with aspects of the invention there is provided a wind turbine rotor blade, which comprises a root end, a tip end, a leading edge section, a trailing edge section and a serrated extension, wherein the serrated extension is attached to the trailing edge section and comprises at least a first tooth. The wind turbine rotor blade comprises at least one patterning element for guiding a wind flow which is flowing from the leading edge section to the trailing edge section such that noise which is generated at the trailing edge section is reduced. The patterning element has the shape of a ridge.

The serrated extension may have the shape of a serrated panel. In other words, the serrated extension may have the shape of a plate with serrations at one or more sides of the plate.

Fabrication of such a serrated panel may happen independently from fabrication of the remaining wind turbine rotor blade. During or after the fabrication of the remaining wind turbine rotor blade the pre-fabricated serrated panel may be attached to it. It may even be attached to the wind turbine rotor blade as a retrofit, which means that the serrated panel is attached to a wind turbine rotor blade which is already mounted and connected with the remaining wind turbine. The wind turbine may also have been in operation for a while after the serrated panel is attached to the wind turbine rotor blade.

It shall be noted that the invention also includes a wind turbine rotor blade where the serrated extension is fabricated integrally with the fabrication of the wind turbine rotor blade. In other words, the serrated extension is manufactured at the same time and together with the remaining wind turbine rotor blade.

The wind turbine rotor blade comprises a ridge-shaped patterning element. The patterning element can be understood as an elongated three-dimensional object which has the shape of a ridge or a hill. The patterning element may be attached to the serrated extension, in particular to the first tooth of the serrated extension. Additionally or alternatively, the patterning element may be connected or attached to other parts of the wind turbine rotor blade.

It should be understood that the notion "ridge-shaped patterning element" also includes grooves which are fabricated into the wind turbine rotor blade, as long as these grooves serve the same purpose to reduce noise which is generated at the trailing edge section of the wind turbine rotor blade. Furthermore, also fins shall be comprised by the notion "ridge-shaped patterning element".

An advantage and objective of the patterning element is a noise reduction. Specifically, this relates to noise which is generated by the wind turbine rotor blade. More specifically, this relates to both pressure side noise which is generated at a pressure side of the wind turbine rotor blade and suction side noise which is generated at a suction side of the wind turbine rotor blade.

In terms of frequencies, the noise may be reduced in a broad range of the frequency spectrum.

In an advantageous embodiment, the patterning element is arranged such that a streamline of the wind flow is deflected by the patterning element towards a tip of the first tooth.

A streamline can be assigned to the wind flow, which can be understood as the flow of a fluid. The streamline can also be understood as being composed of tangential velocity vectors of the wind flow at each point of the wind flow.

The streamline is deflected by the patterning element. It is advantageous to deflect the streamline towards the tip of the tooth, e.g. the first tooth, as this potentially reduces the noise which is generated by the wind flow.

It may however also be advantageous to deflect the streamline explicitly towards the region in between two adjacent teeth. In other words, it may also be advantageous to guide the wind flow between two adjacent teeth.

In another advantageous embodiment, the patterning element comprises a longitudinal ridge extension, a transversal ridge extension and a ridge height. Furthermore, the patterning element comprises a ridge crest, which is defined by a maximum ridge height for each transversal ridge extension. The ridge crest is substantially perpendicular to a trailing edge of the trailing edge section.

Advantageously, the longitudinal ridge extension is greater than the transversal ridge extension. Thus, the patterning element has the shape of an elongated three-dimensional object. The cross-section of the patterning element in a plane which is perpendicular to the longitudinal ridge extension may for instance have the shape of a triangle or an elliptic arc.

Advantageously, the ridge crest substantially has the same length along the whole longitudinal ridge extension. Alternatively, it may have a varying length along the longitudinal ridge extension.

A patterning element may also comprise two ridges, wherein the first ridge comprises a first ridge crest and the second ridge comprises a second ridge crest. Then, advantageously, both ridges may be arranged such that the two ridge crests are substantially parallel to each other and building a valley between them.

It is advantageous that the ridge crest is substantially perpendicular to a trailing edge of the wind turbine rotor blade. The trailing edge is defined as the outermost line of the trailing edge section with regard to a chord that is extending from the leading edge section to the trailing edge section. It shall be noted that the notion "substantially" comprises deviations of up to 45 degrees, in particular of up to 30 degrees. An advantage of substantially parallel ridge crests with regard to the wind flow is that thus the streamline of the wind flow can most efficiently be influenced, in particular deflected.

In another advantageous embodiment, the patterning element is located upstream, compared to the first tooth, with regard to the wind flow which is flowing from the leading edge section to the trailing edge section of the wind turbine rotor blade.

In this embodiment, the patterning element may also be denoted as an upstream ridge.

One example of how upstream ridges may advantageously influence the streamline of the wind flow such that noise that is generated by the wind flow is reduced is the following:

The serrated extension comprises a plurality of conventional teeth, such as triangularly shaped teeth which are bent, i.e. inclined, by several degrees towards a pressure side or suction side of the wind turbine rotor blade, wherein the inclination of the teeth is referred to a trailing edge streamline of the wind flow. By the serrated extension a first frequency range of the noise is efficiently reduced. Now, by adding and attaching upstream ridges at a part of the wind turbine rotor blade which is upstream with regard to the serrated extension, the streamline of the wind flow is deflected towards the tips of the teeth. A consequence of this deflection of the streamline is that a second frequency range of the noise, is also efficiently reduced. Thus, the upstream ridges deliver the benefit that a broadband noise reduction is achieved.

In an advantageous embodiment, the patterning element is located at the trailing edge section.

An advantage of arranging, i. e. locating, the patterning element close to the serrated extension, i. e. within the trailing edge section, is that by this the wind flow can efficiently be deflected.

In another advantageous embodiment, the ridge crest is located substantially centered in between the first tooth and a second tooth, wherein the second tooth is adjacent to the first tooth.

Advantageously, the serrated extension comprises a plurality of teeth. Then, the patterning element, i. e. the upstream ridges, are advantageously located in between the teeth. More specifically, the ridge crest is located substantially centered in between the teeth. This helps to efficiently deflect and influence the streamline of the wind flow towards the tips of the teeth.

In another advantageous embodiment, a first ridge and a second ridge are symmetrically placed on either side of a centerline between two adjacent teeth. That is, the patterning element may comprise two ridges with a "valley" in between. In particular, the two ridges upstream of the teeth may also be bent towards the centerline between the two adjacent teeth with a minimum distance between the respective ridge crests downstream near the teeth. This concept is also referred to as the "wishbone" concept.

In another advantageous embodiment, the patterning element is located on a surface of the first tooth.

Placing the patterning element on the tooth surface follows in principle the same objectives as described above for the patterning element located upstream compared to the first tooth. A patterning element which is located on a surface of a tooth may also advantageously influence, i. e. deflect, the streamline of the wind flow.

An advantage of placing the patterning element on the tooth surface is a facilitation of manufacturing the patterning element and attaching the patterning element to the wind turbine rotor blade.

Another advantage of locating or placing the patterning element on the tooth surface is that the aerodynamic properties of the wind turbine rotor blade are not impaired by the patterning elements.

In another advantageous embodiment, the first tooth comprises a tooth suction side and a tooth pressure side, and the patterning element is located on the tooth pressure side of the first tooth.

Placing the patterning element explicitly on the pressure side of the first tooth has the advantage that specifically high frequencies of the noise which is generated by the wind turbine rotor blade are addressed and efficiently reduced by the patterning element.

However, it may also be advantageous to place the patterning element explicitly on the suction side of the first tooth in order to address and efficiently reduce another specific frequency range of the noise.

In another advantageous embodiment, the serrated extension comprises alternating teeth.

Employing alternating teeth refers to the idea of having a first number of teeth with a first design and a second number of teeth with a second design and arranging the first number of teeth and the second number of teeth such that both types of teeth alternate. In particular, they may periodically alternate. An advantage of alternating teeth is that various components of the noise generated by the wind turbine rotor blade can be addressed. For instance, various frequency ranges can be addressed by different teeth designs. This concept of alternating teeth can well be combined with patterning elements as described above. Thus, a combination of the inventive patterning element with alternating teeth of a serrated extension can be very beneficial. It should be noted that both patterning elements upstream with regard to the first tooth and patterning elements on a tooth surface can also advantageously be combined.

In another advantageous embodiment, the patterning element comprises plastic.

For example, the patterning element may be made of polyurethane (PUR). Plastic is easily available, inexpensive and easy to handle during manufacturing.

In another advantageous embodiment, the patterning element is attached to an opposite surface of the wind turbine rotor blade by means of an adhesive.

The opposite surface, which is also denoted as countersurface, of the wind turbine rotor blade refers to a portion of the surface of the wind turbine rotor blade where the patterning element is attached to or connected with. This attachment is advantageously performed by an adhesive, such as a glue.

Alternatively, the manufacturing the patterning element is a part of the integral manufacturing process of the wind turbine rotor blade itself. The integral manufacturing process is beneficially performed by means of a mould and the vacuum assisted resin transfer (VART) technique.

It should be noted that the inventive idea may also be transferred and applied to other applications where trailing edge noise exists, e.g. aircraft wings or ventilation fans.

The invention is also directed towards a method to reduce noise which is generated at a trailing edge section of a wind turbine rotor blade. The wind turbine rotor blade comprises a root end, a tip end, a reading edge section, the trailing edge section and a serrated extension. The serrated extension comprises at least a first tooth and is attached to the trailing edge section. The method is characterized in that at least one patterning element of the wind turbine rotor blade guides a wind flow which is flowing from the leading edge section to the trailing edge section such that noise which is generated at the trailing edge section is reduced. The patterning element is shaped as a ridge.

Further advantageous embodiments of the invention which have been described as features of the wind turbine rotor blade may advantageously also be included in the method to reduce noise generated at the trailing edge section of a wind turbine rotor blade.

BRIEF DESCRIPTION OF THE DRAWINGS

Embodiments of the invention are now described, by way of example only, with reference to the accompanying drawings, of which:

FIG. 7 shows ridges attached to the trailing edge section to a surface of the tooth.

The illustration in the drawings is schematically. It should furthermore be noted that numerals which refer to similar features or elements are referred to with the same numeral throughout the figures.

DESCRIPTION OF THE DRAWINGS

Figure 1:
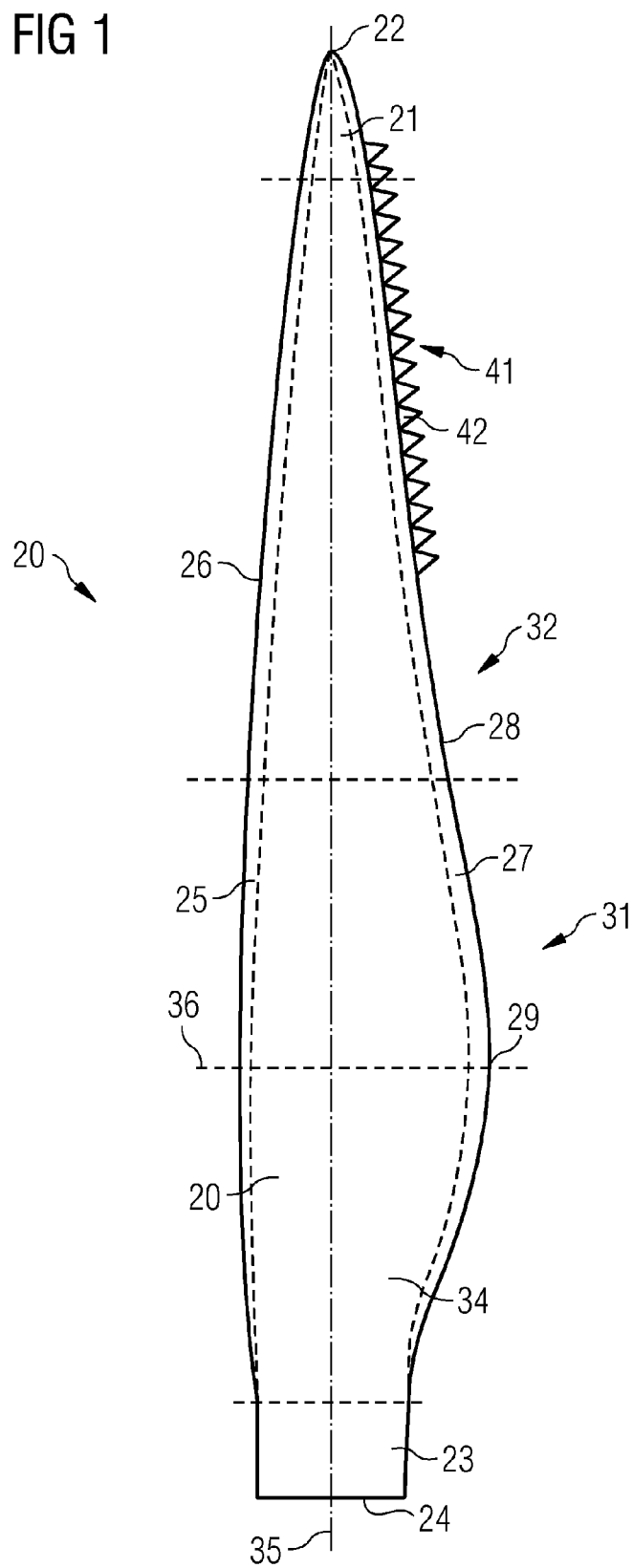
FIG. 1 shows a conventional wind turbine rotor blade with a serrated extension in a top view.

FIG. 1 shows a top view or plan view of a conventional wind turbine rotor blade 20 comprising a serrated extension 41. The wind turbine rotor blade 20 comprises a tip 22 and a root 24. The portion of the wind turbine rotor blade 20 which is surrounding the tip 22 is referred to as tip end 21. In particular, a volume of the tip end 21 comprises less than 10 percent of the volume of the whole wind turbine rotor blade 20. Likewise, the portion of the wind turbine rotor blade 20 which is surrounding the root 24 is referred to as root end 23. Again, in particular, the volume of the root end 23 is less than 10 percent of the whole volume of the wind turbine rotor blade 20.

Furthermore, the wind turbine rotor blade 20 comprises a leading edge 26 and a trailing edge 28. The portion of the wind turbine rotor blade 20 which is surrounding the leading edge 26 is referred to as leading edge section 25. Likewise, the portion of the wind turbine rotor blade 20 which is surrounding the trailing edge 28 is referred to as trailing edge section 27.

Furthermore, the wind turbine rotor blade 20 comprises a span 35 which is extending from the root 24 to the tip 22 and which is also denoted as a rotor blade longitudinal axis. An imaginary line which is connecting the leading edge 26 and the trailing edge 28 and which is perpendicular to the span 35 is denoted as a chord 36 of the wind turbine rotor blade 20. Obviously, a chord 36 may be defined for each longitudinal position along the span 35 of the wind turbine rotor blade 20. The point at the trailing edge 28, where the chord 36 is maximal, is denoted as shoulder 29 of the wind turbine rotor blade 20. Additionally, the wind turbine rotor blade 20 comprises a pressure side 33 and a suction side 34. Furthermore, the wind turbine rotor blade 20 is divided into an inboard part 31 which is adjacent to the root 24 and an outboard 32 which is adjacent to the tip 22. In the example shown in FIG. 1, the serrated extension 41 comprises a plurality of teeth, amongst them a first tooth 42. The serrated extension 41 is located in the outboard part 32 of the wind turbine rotor blade 20.

Figure 2:
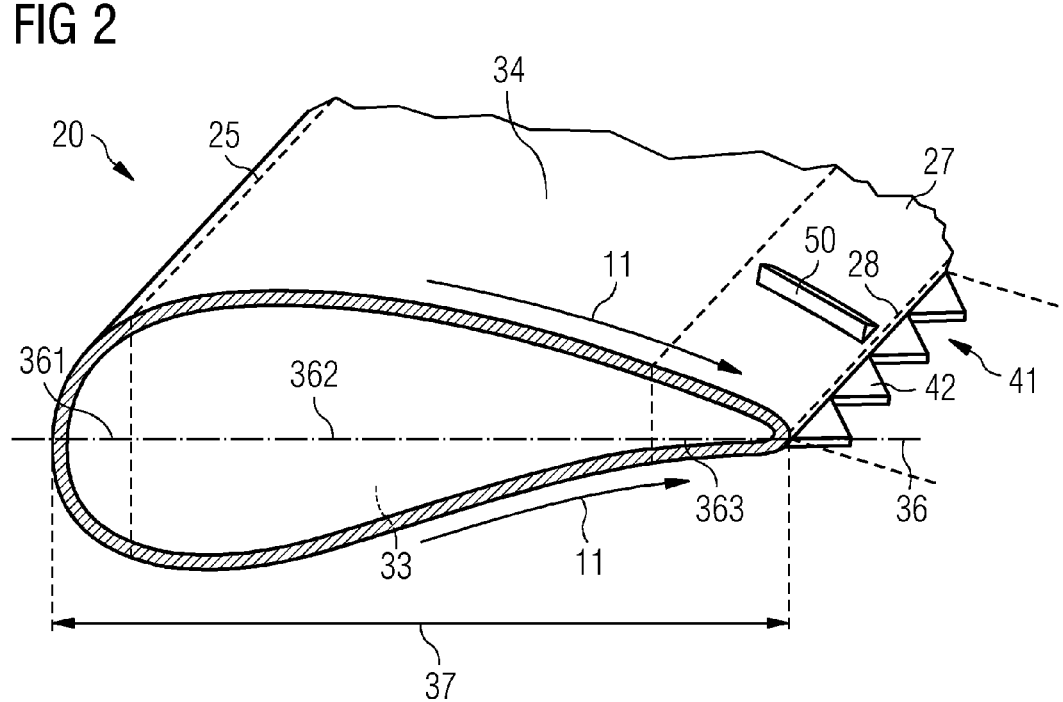
FIG. 2 shows an inventive wind turbine rotor blade with a serrated extension and a patterning element in a perspective view.

FIG. 2 shows a perspective view of a wind turbine rotor blade 20. In this view, it can be seen that the chord 36 can be divided into a first part 361, a second part 362 and a third part 363. It can furthermore be seen that the leading edge section 25 comprises the first part 361 of the chord 36. Likewise, the trailing edge section 27 comprises the third part 363 of the chord 36. The length of the first part 361 is less than 10 percent with regard to a total chord length 37; the length of the third part 363 is less than 20 percent of the chord length 37.

FIG. 2 shows how a wind may flow across the wind turbine rotor blade 20. The wind flow at the suction side 34 and at the pressure side 33 is both denoted by the reference numeral 11. FIG. 2 also shows a ridge-shaped patterning element 50 which is attached to the trailing edge section 27 and which is arranged for deflecting the wind flow 11 such that noise that is generated by the wind flow 11 is reduced.

Figure 3:
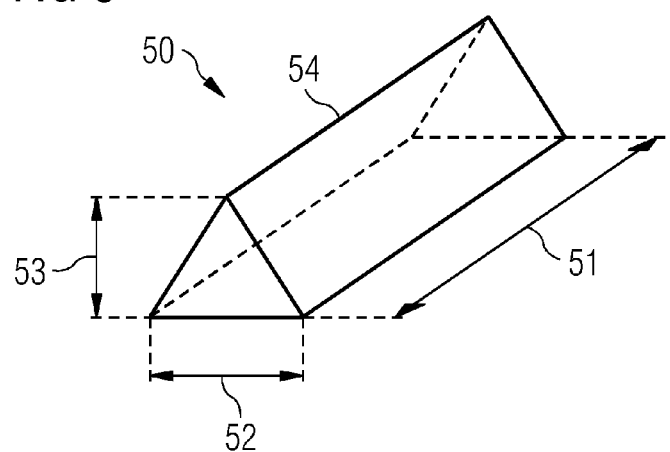
FIG. 3 shows a perspective view of a patterning element.

FIG. 3 shows exemplarily a ridge-shaped patterning element 50 in a perspective view. The patterning element 50 comprises a longitudinal ridge extension 51, a transversal ridge extension 52 and a ridge height 53. Furthermore, the patterning element 50 comprises a ridge crest 54 which is defined by a maximum ridge height for each transversal position. In a cross-section which is perpendicular to the longitudinal ridge extension 51 the patterning element 50 has a triangular shape.

Figure 4:
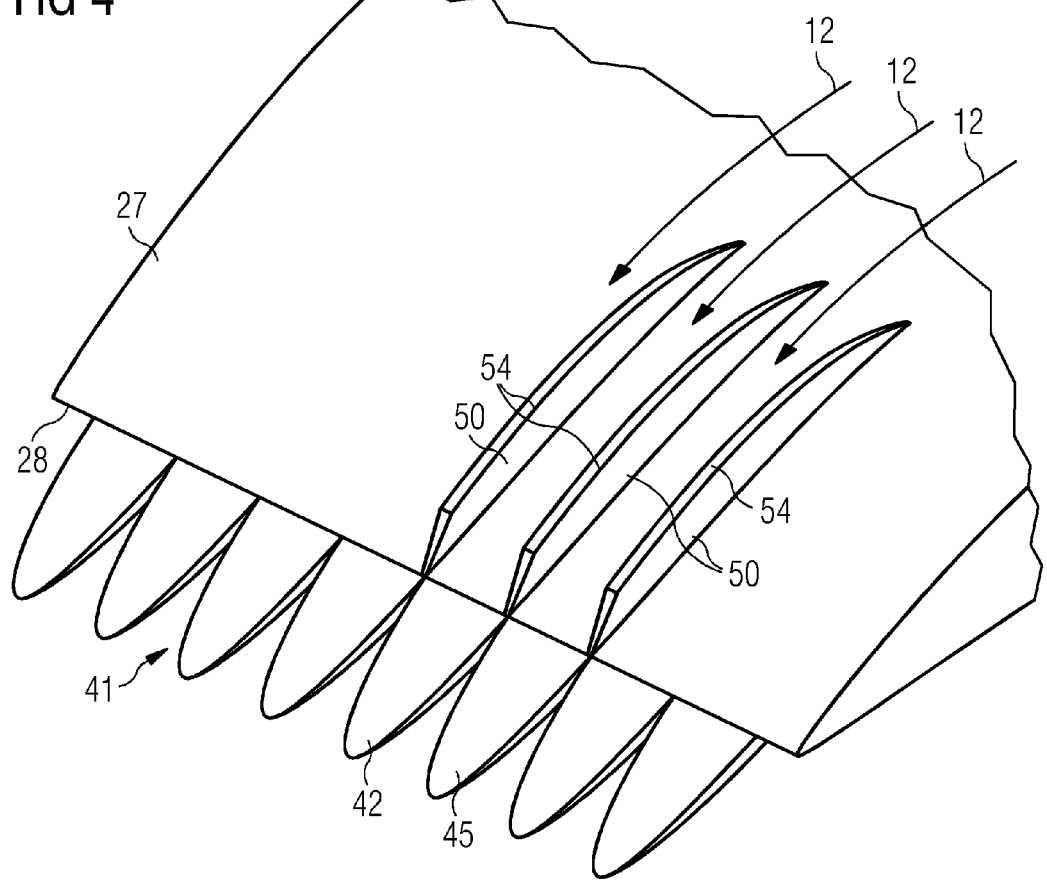
FIG. 4 shows upstream ridges attached to a wind turbine rotor blade.

FIG. 4 shows a set of upstream ridges. In other words, a set of three patterning elements 50 are attached to a trailing edge section 27 of a wind turbine rotor blade 20. The wind turbine rotor blade 20 also comprises a serrated extension 41 with a plurality of teeth, amongst them a first tooth 42 and a second tooth 45. The first tooth 42 is adjacent to the second tooth 45. The flow direction of a wind flow which is passing across the wind turbine rotor blade 20 from the leading edge section 25 to the trailing edge section 27 is denoted by a streamline 12 of the wind flow. It has to be noted that the streamline 12 of the wind flow is guided and deflected by the upstream ridges 50. The ridge crests 54 are located substantially perpendicular to a trailing edge 28 of the trailing edge section 27. For instance, the streamline 12 is deflected in a way that specifically high-frequency noise that is generated by the wind flow is reduced by the teeth of the serrated extension 41.

Figure 5:
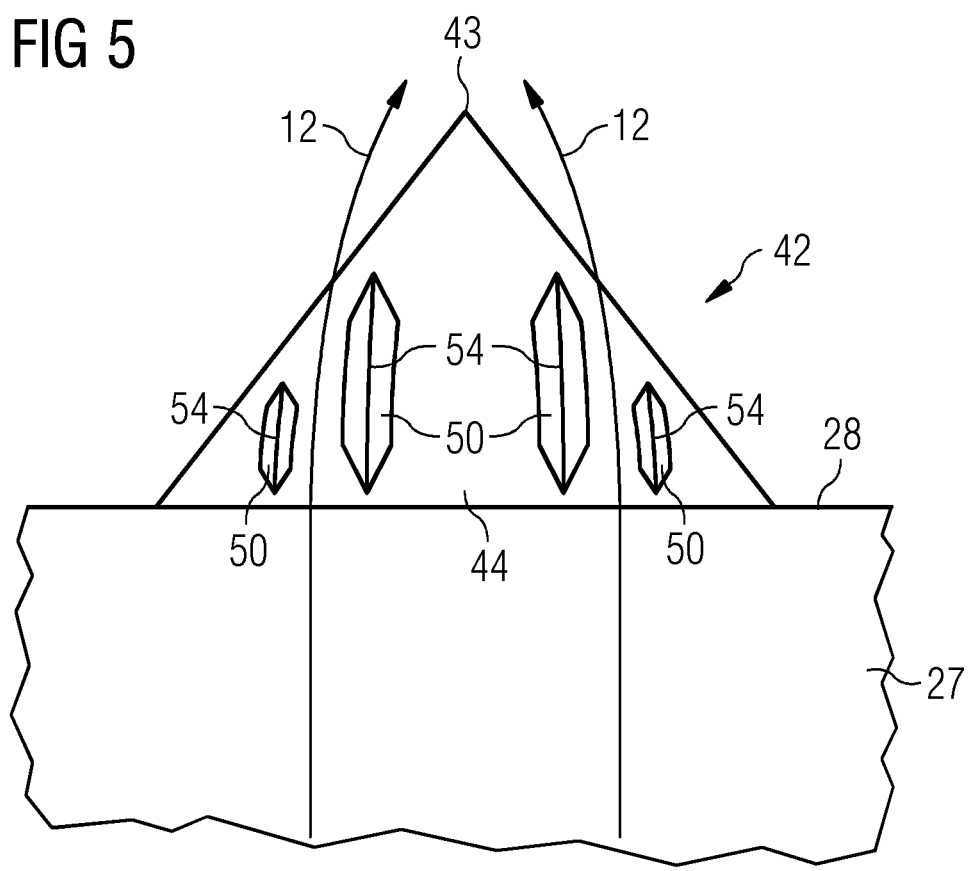
FIG. 5 shows ridges attached to a surface of a tooth of a serrated extension.

FIG. 5 shows patterning elements 50 which are attached to a tooth pressure side 44 of a first tooth 42 of a serrated extension. The first tooth 42 comprises a tip 43. The first tooth 42 is attached to a trailing edge 28 of a trailing edge section 27 of a wind turbine rotor blade. The patterning elements 50 comprise are ridge-shaped. A ridge crest 54 for each patterning element 50 is shown in FIG. 5. It can be seen that the patterning elements 50 are designed such that their ridge crests 54 are substantially perpendicular to the trailing edge 28; however, they are slightly bent. As a consequence of this, a streamline 12 of a wind flow flowing across the trailing edge section 27 and across the first tooth 42, is guided, i.e. bent, by the patterning elements 50.

More specifically, the streamline 12 is bent towards the tip 43 of the first tooth 42. This implies a noise reduction in a high-frequency range of frequencies above 1 kHz. Thus, the overall noise which is generated by wind flowing across the wind turbine rotor blade is achieved.

Figure 6:
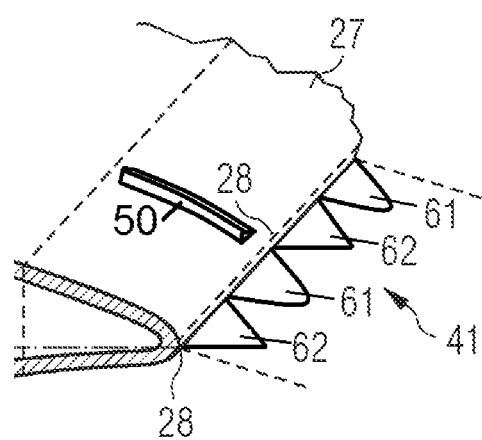
FIG. 6 shows alternating teeth of a serrated extension.

FIG. 6 shows an example embodiment where the serrated extension 41 includes alternating teeth 61, 62.

FIG. 7 shows ridges 50 attached to the trailing edge section 27 and to the pressure side 44 of the first tooth 42 of the serrated extension.

The invention claimed is:

1. A wind turbine rotor blade, comprising:
 a root end, a tip end, a leading edge section, a trailing edge section, and a serrated extension comprising teeth, wherein the serrated extension is attached to the trailing edge section, and
 a patterning arrangement comprising a patterning element comprising a ridge shape,
 wherein a wind flow flowing from the leading edge section to the trailing edge section defines streamlines,
 wherein the patterning arrangement is configured to deflect the streamlines toward locations,
 wherein each location is limited to a tip of a single respective tooth,
 wherein the patterning element comprises a longitudinal ridge extension, a transversal ridge extension and a ridge height,
 wherein the patterning element comprises a ridge crest, defined by a maximum ridge height for each transversal ridge extension,
 wherein the ridge crest is substantially perpendicular to a trailing edge of the trailing edge section,
 wherein the patterning element is located upstream, compared to the teeth, with regard to the wind flow which is flowing from the leading edge section to the trailing edge section of the wind turbine rotor blade,
 wherein the patterning element is located at the trailing edge section, and
 wherein the ridge crest is located substantially centered in a single respective region between adjacent teeth.

2. The wind turbine rotor blade according to claim 1, wherein the patterning element is located on a surface of a respective tooth.

3. The wind turbine rotor blade according to claim 2, wherein the respective tooth comprises a tooth suction side and a tooth pressure side, and the patterning element is located on the tooth pressure side of the respective tooth.

4. The wind turbine rotor blade according to claim 1, wherein the serrated extension comprises alternating teeth.

5. The wind turbine rotor blade according to claim 1, wherein the patterning element comprises plastic.

6. The wind turbine rotor blade according to claim 1, wherein the patterning element is attached to an opposite surface of the wind turbine rotor blade by an adhesive.

7. The wind turbine rotor blade of claim 1, wherein the patterning arrangement comprises plural patterning elements per respective tooth.

8. The wind turbine rotor blade of claim 7, wherein the plural patterning elements per respective tooth are disposed on the respective tooth and curve toward each other in a downstream direction with respect to a direction of flow of the wind flow.

9. The wind turbine rotor blade according to claim 1, wherein the trailing edge section is limited to less than twenty percent of a total chord length of the wind turbine rotor blade, and wherein the patterning arrangement is limited to the trailing edge section.

10. A method to reduce noise which is generated at a trailing edge section of a wind turbine rotor blade, wherein the wind turbine rotor blade comprises a root end, a tip end, a leading edge section, the trailing edge section, a trailing edge, and a serrated extension comprising teeth, wherein the serrated extension is attached to the trailing edge section, the method comprising:
 with a patterning arrangement comprising a patterning element, in a wind flow which is flowing from the leading edge section to the trailing edge section, deflecting streamlines in the wind flow into locations, wherein each location is limited to a tip of a single respective tooth,
 wherein the patterning element is located upstream of the trailing edge with regard to the wind flow which is flowing from the leading edge section to the trailing edge section of the wind turbine rotor blade, and
 wherein the serrated extension is located downstream of the trailing edge section with regard to the wind flow which is flowing from the leading edge section to the trailing edge section of the wind turbine rotor blade.

11. The method of claim 10, wherein the patterning element comprises a ridge shape.

12. A wind turbine rotor blade, comprising
 a root end, a tip end, a leading edge section, a trailing edge section, and a serrated extension comprising teeth, wherein the serrated extension is attached to the trailing edge section, and
 a patterning arrangement comprising a patterning element,
 wherein a wind flow flowing from the leading edge section to the trailing edge section defines streamlines,
 wherein the patterning arrangement is configured to deflect the streamlines toward locations,
 wherein each location is limited to a tip of a single respective tooth, and
 wherein the serrated extension comprises alternating teeth.

13. A wind turbine rotor blade, comprising
 a root end, a tip end, a leading edge section, a trailing edge section, and a serrated extension comprising teeth, wherein the serrated extension is attached to the trailing edge section, and
 a patterning arrangement comprising a patterning element comprising a ridge shape,
 wherein a wind flow flowing from the leading edge section to the trailing edge section defines streamlines,
 wherein the patterning arrangement is configured to deflect the streamlines toward locations,
 wherein each location is limited to a tip of a single respective tooth,
 wherein the patterning arrangement comprises plural patterning elements per respective tooth, and wherein the plural patterning elements per respective tooth are disposed on the respective tooth and curve toward each other in a downstream direction with respect to a direction of flow of the wind flow.

14. A wind turbine rotor blade, comprising a root end, a tip end, a leading edge section, a trailing edge section, and a serrated extension comprising teeth, wherein the serrated extension is attached to the trailing edge section, and a patterning arrangement comprising a patterning element, wherein a wind flow flowing from the leading edge section to the trailing edge section defines streamlines, wherein the patterning arrangement is configured to deflect the streamlines toward locations, wherein each location is limited to a tip of a single respective tooth, wherein the patterning element comprises a longitudinal ridge extension, a transversal ridge extension and a ridge height, wherein the patterning element comprises a ridge crest, defined by a maximum ridge height for each transversal ridge extension, wherein the ridge crest is substantially perpendicular to a trailing edge of the trailing edge section, wherein the patterning element is located upstream, compared to the teeth, with regard to the wind flow which is flowing from the leading edge section to the trailing edge section of the wind turbine rotor blade, wherein the patterning element is located at the trailing edge section, and wherein the trailing edge section is limited to less than twenty percent of a total chord length of the wind turbine rotor blade, and wherein the patterning arrangement is limited to the trailing edge section.

* * * * *